May 5, 1959    D. G. ANDERSON    2,884,946
CONTROL APPARATUS
Filed Dec. 19, 1955    2 Sheets-Sheet 1

INVENTOR.
DONALD G. ANDERSON
BY Joseph E. Ryan
ATTORNEY

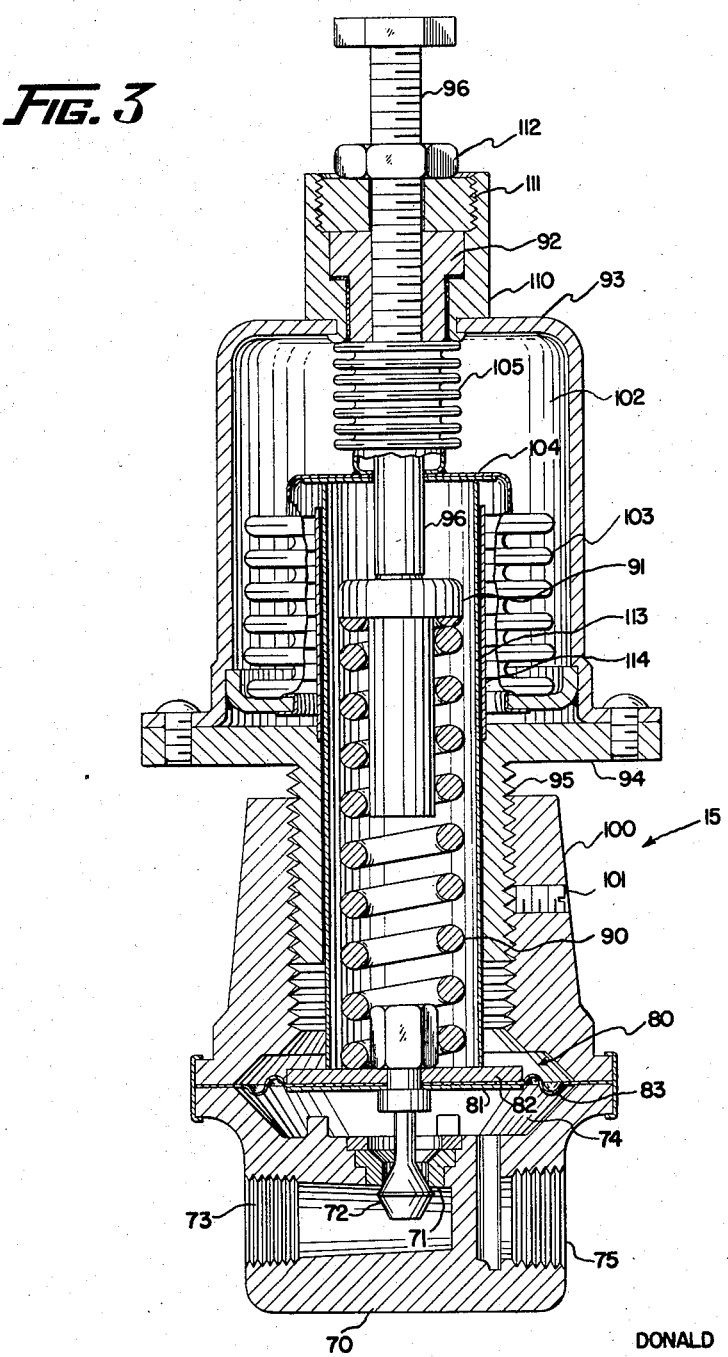

United States Patent Office 2,884,946
Patented May 5, 1959

2,884,946
CONTROL APPARATUS

Donald George Anderson, Minneapolis, Minn., assignor to Minneapolis-Honeywell Regulator Company, Minneapolis, Minn., a corporation of Delaware Application December 19, 1955, Serial No. 553,822

8 Claims. (Cl. 137—209)

The present invention is concerned with apparatus for maintaining a predetermined pressure schedule in a container, the pressure maintained depending upon a predetermined condition. In particular, in a beverage dispensing apparatus, gas pressure is maintained above the beverage in a storage tank at a selected level by a regulator valve and the setting of the regulator valve is adjusted by ambient temperature; furthermore, the maximum pressure allowable in the tank is controlled by a relief valve and the setting of the relief valve is adjusted by ambient temperature.

Where it is not convenient to dispense carbonated beverage in sealed bottles a beverage dispensing unit having a storage tank from which the liquid is drawn through a flash cooler into cups is often used. In order to carbonate the beverage a supply tank of carbon dioxide is connected to the storage tank to maintain a pressure of carbon dioxide above the beverage therein. As the ambient temperature changes and the temperature of the beverage in the storage tank changes, the ability of the beverage to take on or absorb carbon dioxide greatly changes. Furthermore, the amount of carbon dioxide in the beverage when it is dispensed from the unit is quite effective on the taste of the beverage. For example, a cold beverage requires a lower carbon dioxide pressure in order to absorb a sufficient amount of carbon dioxide. Should the carbon dioxide pressure be too high and the amount of carbon dioxide absorbed in the beverage is above a certain limit, it will greatly affect the taste of the beverage.

Formerly a pressure regulator valve was used in connecting the gas supply tank to the beverage storage tank and the pressure setting was manually adjusted to maintain the desired pressure of carbon dioxide above the beverage depending upon the surrounding ambient temperature. Should the ambient temperature increase and the temperature of the beverage in the storage tank increase more pressure would be needed thus a manual operator on the regulator was readjusted to raise the maintained carbon dioxide pressure. The manual adjustment of the pressure regulator valve was not always satisfactory as it is not always possible to predict the ambient temperature. It is possible upon an increase in the ambient temperature and no change in the pressure maintained above the beverage in the storage tank, the amount of carbon dioxide absorbed in the beverage would drop causing it to lose its savouriness.

The present invention is concerned with an improved apparatus for maintaining the pressure of the carbon dioxide above the beverage in the storage tank at the desired value for various ambient temperatures. In particular the carbon dioxide gas supply tank is connected to the storage tank by an ambient temperature adjusted pressure regulator valve so that the pressure maintained above the beverage in the storage tank is of the proper value for various ambient temperatures. Should the temperature increase the pressure maintained above the beverage is increased and assuming there is nothing drawn from the storage tank a later drop in the ambient temperature would result in a "locking up" of the system, that is, a pressure in the storage tank greater than that to be maintained by the regulator valve. An ambient temperature adjusted pressure relief valve is connected downstream of the regulator valve for limiting the maximum pressure in the storage tank to a level slightly above the pressure maintained by the regulator valve at various ambient temperatures. Thus upon a large drop in the ambient temperature the "locking up" cannot occur as the maximum pressure setting of the relief valve would be dropped and the system would be bled until the maximum pressure was that desired at the particular temperature.

It is therefore an object of the present invention to provide an improved system for maintaining a desired gas pressure schedule above a liquid in a storage tank.

Another object of the present invention is to provide apparatus for maintaining a predetermined schedule of the carbon dioxide pressure above a beverage in a storage tank, the pressure varying with changes in ambient temperature.

Another object of the present invention is to provide an improved pressure regulating valve for connecting the gas supply to a beverage storage tank for maintaining a predetermined gas pressure in the tank, the regulator valve having means, for adjusting its setting, which is responsive to the ambient temperature.

A further object of the present invention is to provide in a system for maintaining a gas pressure above the liquid in a tank a relief valve to limit the maximum pressure of the tank, this relief valve having means responsive to ambient temperature for adjusting its setting.

These and other objects will become apparent upon a study of the following specification and drawings of which Figure 1 is a schematic diagram of the present invention, in particular when used in a beverage dispenser.

Figure 3 is a detailed showing of the ambient temperature adjusted pressure regulator valve used in the system as shown in Figure 1.

Figure 1:
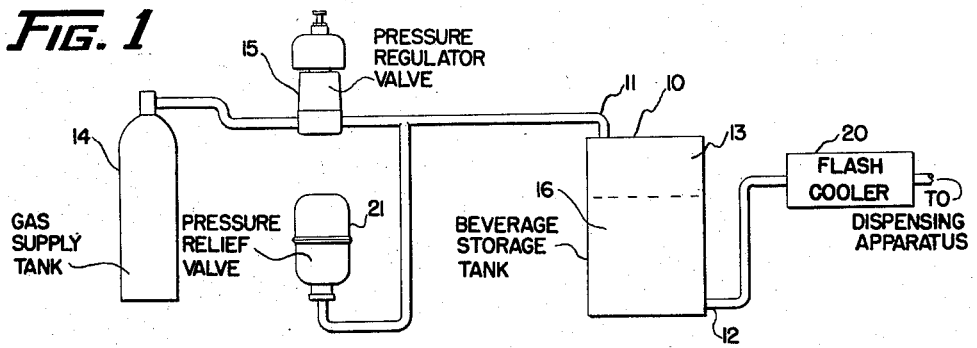

Description of Figure 1

Referring to Figure 1 the beverage storage tank or container 10 is shown having an inlet 11 and an outlet 12. Chamber 13, above the liquid beverage 16 in the tank is filled with carbon dioxide which is absorbed by the beverage to provide the carbonation or "fizz." A gas supply tank 14 containing carbon dioxide gas under pressure is connected to inlet 11 through an ambient temperature adjusted pressure regulating valve 15. This valve maintains a predetermined pressure in the chamber 13 depending upon the regulator setting as adjusted by the ambient temperature. Outlet 12 is connected to a flash cooler which delivers the cool beverage as it passes therethrough to some sort of dispensing apparatus. An ambient temperature adjusted pressure relief valve 21 is connected down stream of valve 15 for limiting the maximum pressure of tank 10. The valve 21 limits the maximum pressure in tank 10 to a few pounds more than the pressure maintained by valve 15 at any particular ambient temperature.

Figure 2:
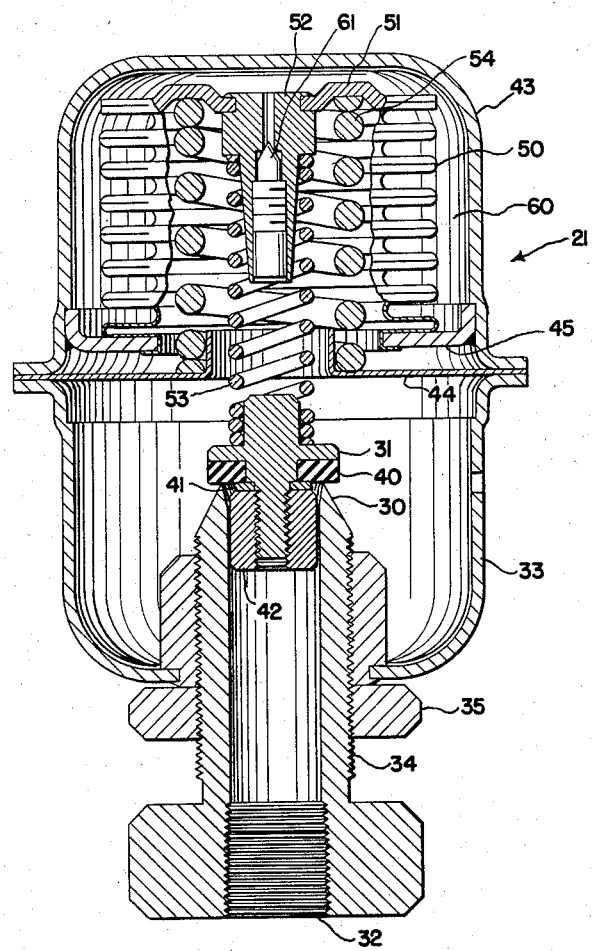
Figure 2 is a detailed drawing of the ambient temperature adjusted pressure relief valve used in the system as shown in Figure 1.

Description of Figure 2

Referring to ambient temperature adjusted pressure relief valve 21, as shown in Figure 2, a valve seat 30 has a valve closure member 31 in a closed position therewith. Valve seat 30 is connected by a suitable threaded opening 32 to a conduit which is connected to the tank 10 as shown in Figure 1. Seat member 30 is threaded into a cup shaped casing member 33 by suitable threads 34 on its outer surface. The position of the valve seat can thus be raised or lowered in casing 33 by screwing it in or out of the casing. A locking nut 35 also received by threads 34 is set in position once the height of seat member 30 is as described. Closure member 31 has a seating surface 40 held in place by a washer 41 and nut 42 threadably connected to seat member 31.

A similar cup shaped casing member 43 has its open end butting and connected to the open end of casing 33. A disc type supporting member 44 separates the chambers of the two casing members. When casing members 33 and 43 are attached by means such as rivets or clamps (not shown) the casing members form integral casing unit which contains the previously mentioned valve seat and enclosure, members 30 and 31 respectively, as well as associated mechanism. A disc type support member 45 is attached to the open end of casing 43. It has a hole in its center to which one end of a bellows assembly 50 is connected. The other end of the bellows assembly is connected to a supporting plate 51 higher up in casing member 43. To the center of supporting plate 51 is connected a support and filling connection member 52 extending downward into the center cavity of bellows 50. Closure member 31 is spring biased downward by a coil spring 53 compressed between the upper surface of the closure member and member 52. A second larger coil spring 54 is compressed between member 44 and member 51 to provide an upward force on bellows assembly 50 to elongate it between lower support 45 and support 51. The sealed chamber 60 between the outer surface of bellows assembly 50 and the inner surface of casing 43 is filled with a temperature responsive gas during the assembly of the relief valve. Gas is fed into the filling member 52 and when the pressure therein is at a predetermined value a suitable plug 61 is inserted to block off the filling passage.

By the proper design of the bellows assembly and associated spring and the correct amount of gas under pressure in chamber 60, the downward force on closure member 31 is sufficient to maintain the closure member against its associated seat 30. A final adjustment of the relief valve pressure is available by screwing the valve seat 30 in casing member 33 to raise or lower its position. As the temperature of the gas in chamber 60 changes the setting of the pressure needed to lift member 31 is changed. The maximum pressure setting is thus adjusted by ambient temperature.

Description of Figure 3

Regulator valve 15 as shown in Figure 3 has a valve casing 70 containing a valve seat 71 and a closure member 72. The position of closure member 72 controls the flow of gas from the inlet 73 past the valve closure member into chamber 74 and out of outlet 75.

Closure member 72 is connected to diaphragm assembly 80 comprising a pair of plates 81 and 82 fastened on opposite sides of the diaphragm 83. Chamber 74 has one side bounded by diaphragm 83 so that the pressure in the chamber applies a force to the under side of the diaphragm to move closure member 72 upward against seat 71. A downward force is applied to the upper side of diaphragm 83 on a plate 82 by a coil spring 90 which is compressed between plate 82 and member 91 attached to a shaft 96 that is vertically adjusted by its threaded connection through collar 92 which is attached to casing 93. Casing 93 is connected to member 94 which has threaded portion received by the upper portion of the diaphragm assembly casing 100. As member 94 is rotated to be moved either upward or downward with respect to casing 100 the loading of spring 90 is changed, this providing for a calibration of the regulator valve. The member 94 is then locked in position with respect to casing 100 by a suitable set screw 101.

Chamber 102 inside casing 93 is formed by bellows assembly 103 connected at the lower portion of casing 93 and at its upper extremity to a flange 104. Assembly 103 surrounds the coil spring 90. Flange 104 is connected to the upper portion of casing 93 by a sealing bellows 105 which has its upper portion sealed between an outer collar 110 attached to casing 93 and the aforementioned inner collar 92 when it is held in place by a suitable locking screw 111.

Shaft 96 is then isolated from chamber 102 and is free to move up and down as it is threaded to be received by associated threads in collar 92. The movement of shaft 96 provides the final calibration of the regulator by loading spring 90, this adjustment being set by the lock nut 112 on shaft 96.

A cylindrical type sleeve 113 surrounds spring 90 and has its extremities butting against plate 82 of diaphragm assembly 80 and the under side of flange 104. A second cylindrical sleeve member 114 surrounds a portion of sleeve 113 and is connected to member 94 to provide a guide for the bellows assembly 103 during the assembly of the regulator valve. Diaphragm assembly 80 is thus also loaded by the force from the bellows assembly 103 through sleeve 113. Chamber 102 is filled with a temperature responsive gas and as the temperature of this chamber changes the pressure on the bellows assembly 103 changes the downward force on sleeve 113 and thus the loading of diaphragm assembly 80. The design of the regulator valve especially the size of the chamber 102 and the bellows assembly 103 is such that upon proper calibration of the regulator valve a range of regulated pressures at different ambient temperatures are available.

Operation of invention

For purposes of explanation let us assume that it is desired to maintain pressure in chamber 13 of the tank shown in Figure 1 for various ambient temperatures along a linear schedule between two points such as 45 pounds per square inch pressure at 45° F. and 95 pounds per square inch pressure at 95° F. Pressure regulator 15 shown in Figure 3 is calibrated so that as the ambient temperature and thus the gas in chamber 102 varied between 45° and 95° the regulator maintains a down stream pressure in the chamber between 45 and 95 pounds per square inch.

With such a regulated system the pressure of the carbon dioxide gas above the beverage in tank 10 is maintained so that the beverage has its best savouriness. During low ambient temperatures the pressure of the gas is low since the absorption of gas into the beverage requires less pressure. When the ambient temperature is high the absorption of a certain percentage of gas in the beverage requires a greater pressure, this being maintained as upon an increase in the ambient temperature the setting of the regulator is increased.

It is possible, upon a dropping ambient temperature and no withdrawal of beverage from the system, to have a pressure existing in the tank greater than desired, this being known as "locking up." In order to prevent this "locking up," pressure relief valve 21 is connected down stream of the regulator valve. The relief valve shown in Figure 2 has its pressure relief setting adjusted by raising or lowering seat 30 so that over the assumed range of temperatures between 45° and 95° F. the maximum allowable pressure is approximately 5 pounds greater than the setting of the regulator at any particular temperature.

Assuming that the ambient temperature surrounding the system shown in Figure 1 was approximately 80°. The regulator valve 15 then maintains a pressure in chamber 13 of approximately 80 pounds per square inch assuming the previously selected pressure vs. temperature schedule. For the same temperature the relief valve 21 would be closed unless the pressure in chamber 13 rose above 85 pounds per square inch.

Further let us assume that the ambient temperature dropped to 70°, this could happen during an overnight period. With no beverage being withdrawn from the dispensing apparatus the pressure in chamber 13 remains at 80 pounds per square inch while at the new ambient temperature of 70° the pressure scheduled by the regulator is 70 pounds per square inch. If it were not for the relief valve the "locking up" would occur; however, at the new ambient temperature of 70° the relief valve is set to limit the maximum pressure to 75 pounds. Gas is then allowed to escape from chamber 13 to drop the pressure from the 80 pounds per square inch down to a maximum of 75 pounds per square inch. With the regulating valve and the relief valve adjusted by the ambient temperature along the schedules assumed, it is obvious that at no time could the pressure in chamber 13 be more than 5 pounds greater than the setting of the regulator valve for the particular ambient temperature, thus, the extreme "locking up" condition could not occur.

While the present invention has been described in detail it should be realized that the figures selected were for explanation purposes only and that modification may be obvious to one skilled in the art, therefore, the invention should be limited to the scope of the appended claims in which I claim:

1. In liquid beverage dispensing apparatus; a source of gas under pressure; a beverage storage tank having an inlet and outlet; means connecting said source to said inlet to maintain gas under pressure above the liquid beverage in said storage tank so that the liquid can be dispensed from said outlet; said first mentioned means comprising a valve combination of an ambient temperature compensated pressure regulator valve and an ambient temperature compensated pressure relief valve, said regulator valve comprising a valve for controlling the flow of gas from said source, said last mentioned valve having an actuator responsive to downstream pressure thereby maintaining a selected downstream pressure by controlling the flow of gas from said source, temperature sensitive means, and means connecting said sensitive means to adjust said actuator and thus said selected pressure; said relief valve comprising valve means connected downstream of said regulator valve, second temperature sensitive means, and means connecting said second sensitive means to said relief valve means for adjusting its maximum limiting pressure as the ambient temperature changes.

2. In liquid beverage dispensing apparatus; a source of gas under pressure; a beverage storage container having an inlet and an outlet; regulator valve means; means including said valve means connecting said source to said inlet, said regulator valve means comprising flow control means, actuator means responsive to downstream pressure, means connecting said actuator to said flow control means, temperature responsive means responsive to ambient temperature, and means connecting said responsive means to said actuator to adjust its operation thereby determining the gas pressure level maintained downstream said regulator valve means depending on ambient temperature; relief valve means; means connecting said relief valve means downstream said regulator valve means, said relief valve means comprising a valve, ambient temperature responsive resilient means, and means connecting said last mentioned temperature responsive resilient means to said valve means for controlling its opening pressure thereby upon said gas pressure in said container exceeding a predetermined value as determined by the ambient temperature said relief valve will release gas from the container.

3. In liquid beverage dispensing apparatus; a source of gas under pressure; a beverage storage tank, pressure regulator valve means; means including said valve means for connecting said source to said tank for supplying gas to the space above the beverage in said tank; said valve means comprising, actuator means responsive to the pressure downstream said valve means, gas flow control means, means connecting said actuator means to said flow control means, ambient temperature responsive means, and means connecting said temperature responsive means to said actuator means to adjust said pressure maintained downstream in accordance with ambient temperature; relief valve means, means connecting said relief valve means to said tank; said relief valve means comprising, flow control means, resilient means, means connecting said resilient means to said last mentioned flow control means to maintain said flow control means closed as long as the pressure in said tank is below a predetermined level, second ambient temperature responsive means, means connecting said second responsive means to said resilient means thereby said predetermined level of pressure in said tank is set in accordance with ambient temperature.

4. In liquid dispensing apparatus; a storage container for holding a supply of liquid; a source of gas under pressure; pressure regulating means; means including said regulating means for connecting said source to said container; temperature responsive adjusting means, said responsive means being responsive to ambient temperature, means connecting said adjusting means to said regulating means thereby adjusting the pressure maintained in said container, said maintained pressure varying with ambient temperature; pressure relief means; means connecting said pressure relief means to the downstream side of said regulating means; second temperature responsive adjusting means; and means connecting said second adjusting means to said relief means thereby the maximum pressure allowable in said container is determined by the ambient temperature.

5. In a liquid dispensing apparatus; a storage container for holding a supply of liquid; a source of gas under pressure, pressure regulating valve means, means including said valve means for connecting said source to said container so that the gas pressure at said container is maintained at a selected level, temperature responsive adjusting means responsive to ambient temperature, means connecting said adjusting means to said regulating means to adjust the maintained gas pressure so that the selected level varies for various ambient temperatures, ambient temperature adjusted relief valve means, and means connecting said relief valve means to said container.

6. In a liquid dispensing apparatus, a storage tank holding a supply of liquid, a source of gas under pressure, means connecting said source to said tank so that a supply of gas under pressure is maintained above the liquid, relief valve means, means connecting said valve means to said tank so that the pressure of the gas in said tank is maintained below a selected value, temperature responsive adjusting means responsive to ambient temperature, and means connecting said adjusting means to said valve means.

7. In a pressurized system, a source of fluid under pressure, a storage container, pressure regulating means, means including said regulating means connecting said source to said storage container, condition responsive means responsive to a condition indicative of the pressure desired in said storage container, means connecting said responsive means to said regulating means, relief valve means, means connecting said relief valve means to said storage container, second condition responsive means responsive to a condition indicative of the maximum pressure desired in said container, and means connecting said second responsive means to said relief means.

8. In valve apparatus, a valve seat, a valve closure member cooperating with said valve seat to form a valve, a pressure responsive member responsive to the pressure downstream said valve, means connecting said closure member to said responsive member to close said valve when the downstream pressure exceeds a predetermined value, a chamber formed by an inverted cup-shaped member, and a first and second connected bellows inside said cup extending from between the open end of said cup and a hole at the top, said chamber which is between the outer surface of said bellows and the inner surface of said cup being filled with a temperature responsive gas, an adjusting screw threadably received into the top of said cup extending through said bellows, a coil spring compressed between the lower end of said screw and the upper surface of said pressure responsive member so that said predetermined value can be adjusted by loading said member, and a sleeve surrounding said spring and contacting the upper side of said pressure responsive member and said first bellows so that upon the expansion of said gas to collapse said first bellows the loading on said responsive means is changed to reset said predetermined value as the ambient temperature changes.

References Cited in the file of this patent

UNITED STATES PATENTS

| | | |
|---|---|---|
| 655,954 | Brooks | Aug. 14, 1900 |
| 2,150,655 | Hess | Mar. 14, 1939 |
| 2,168,059 | Buttner | Aug. 1, 1939 |
| 2,558,651 | Ives | June 26, 1951 |
| 2,660,343 | Charpiat | Nov. 24, 1953 |
| 2,663,502 | Dillman | Dec. 22, 1953 |
| 2,737,194 | Breeback | Mar. 6, 1956 |
| 2,747,802 | Kmiecik | May 29, 1956 |
| 2,756,936 | Mueller et al. | July 31, 1956 |